Feb. 2, 1960 S. D. POOL ET AL 2,923,207
INTERNAL ANNULAR GROOVE MILLING DEVICE
Filed Oct. 5, 1956 4 Sheets-Sheet 4

INVENTORS.
Stuart D. Pool
Elof K. Karlsson
Paul O. Pippel
Atty.

United States Patent Office 2,923,207
Patented Feb. 2, 1960

2,923,207

INTERNAL ANNULAR GROOVE MILLING DEVICE

Stuart D. Pool and Elof K. Karlsson, Moline, Ill., assignors to International Harvester Company, a corporation of New Jersey Application October 5, 1956, Serial No. 614,158

8 Claims. (Cl. 90—15)

This invention relates to a new and improved internal annular groove milling device.

The milling of internal annular grooves with any degree of accuracy within valve bodies is extremely difficult. Many fluid control valves are presently being used to direct fluid or liquids in hydraulic systems and, as a rule, these control valves must necessarily have a plurality of internal annular grooves to effect a directing or routing of fluid in a particular path depending upon the lateral positioning of a slide or spool therein. The accuracy of the cut for the internal annular grooves becomes increasingly important when much change is accomplished by only short movements of the spool valve or for a small movement of spool controlling large quantities of oil. Quite often the relationship of the several annular grooves in the internal bore of a control valve housing is extremely critical to the success or failure of that valve and hence the milling or cutting of the internal annular grooves is an important factor in valve manufacture. Heretofore it has been necessary to take a tool in from an end opening of the valve body and thereupon cut the annular groove within the inside of the valve body. If more than one groove is required, then the tool is moved longitudinally of the body and another groove cut. However, the spacing of the grooves when they are cut one at a time by a cutting tool which is inserted through the end of the valve body proves to be very difficult and not generally acceptable on mass production basis for the close tolerances required in valves of this type.

It is therefore a principal object of this invention to provide means for simultaneously milling a plurality of internal annular grooves within valve bodies or the like.

An important object of this invention is the provision of means in a milling tool for simultaneously cutting a plurality of internal annular grooves within a body and cutting such grooves with great accuracy whereby the grooves will consistently have an identical relationship with respect to each other and the grooves will be identical in size and shape for all the valve bodies or other devices so ground with that tool.

Another important object of this invention is to supply a cutting tool which includes a plurality of fixedly spaced apart mills thereon adapted to reciprocate radially in a varying orbital path simultaneously with its rotation whereby when the cutting tool is positioned within a valve body or the like it may, and does, cut internal annular grooves in the valve body having uniform spacings and size.

Another and still further important object of this invention is to equip an internal milling machine with a milling tool and means for causing the milling tool to move in a varying orbital path while being rotated about its own axis to effect a grinding of an internal annular groove within a body or the like within which the milling tool is placed.

Still another important object of this invention is to provide a grinding mechanism having a stationary frame structure and a casting mounted for oscillation on the frame structure and operable by eccentric means to effect a varying orbital path of movement of a milling tool whereupon a full annular internal groove may be cut by the milling tool.

Another and still further important object of this invention is in the provision of means in an internal annular groove milling machine in which the grinding or milling tool is rotatably driven and simultaneously driven first in a concentric position within the body to be milled and thence movable in a varying orbital path by reason of drive through an eccentric mechanism and thereafter returning the grinding tool to concentricity within the bore of the body being ground.

A still further important object of this invention is to use an oscillating member mounted on a hinged link and controlled by an eccentric mechanism whereby a grinding tool carried by the oscillating member is movable through a varying orbital path to effect an internal annular grinding of an annular slot.

Other and further important objects and advantages will become apparent from the disclosures in the following specification and accompanying drawings.

Figure 1:
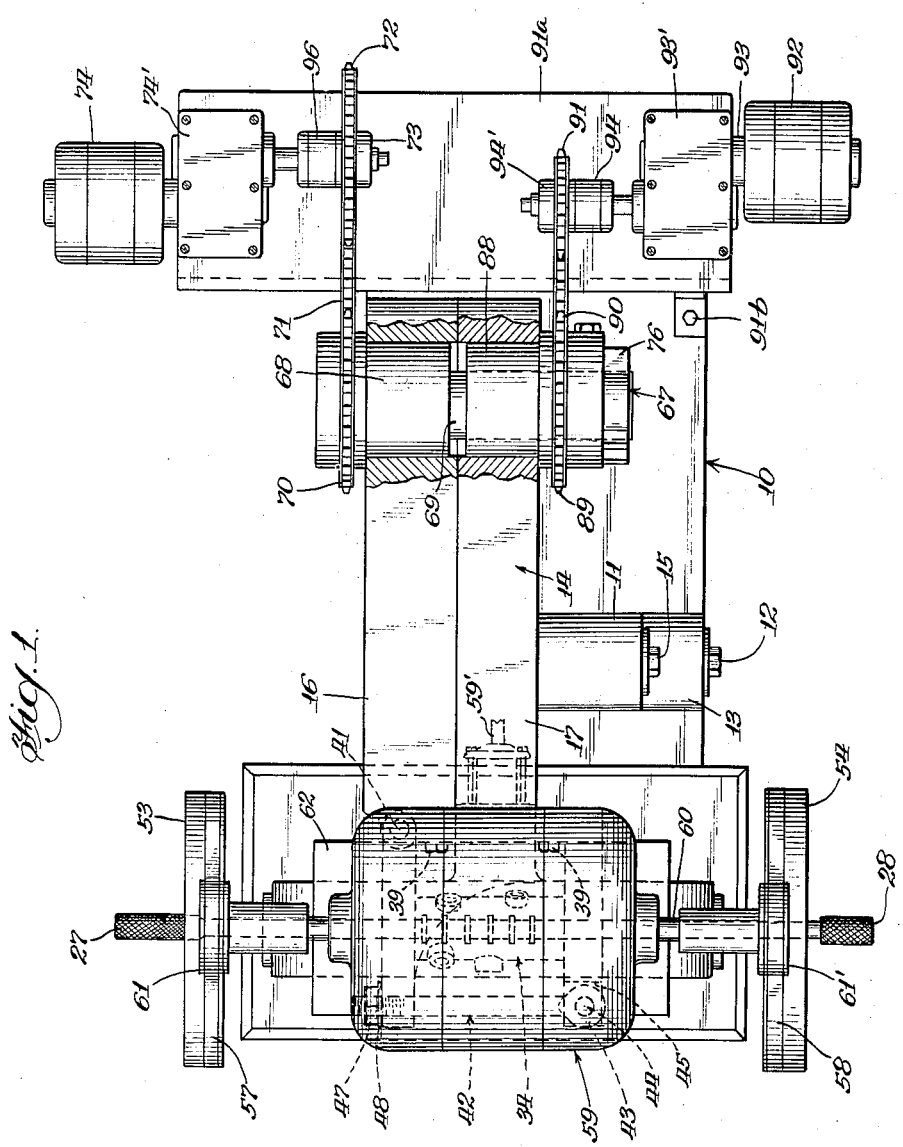
Figure 1 is a top plan view of the internal annular groove milling device of this invention.

As shown in the drawing the reference numeral 10 indicates generally a stationary frame supporting structure on which is mounted a generally vertically disposed link 11. The link 11 is hinged at 12 on an upwardly extending projection 13 from the supporting structure 10. An oscillating casting 14 is hingedly mounted at 15 on the top of the link 11 as shown in Figure 1. The stationary supporting structure includes an upwardly extending portion 16 which is disposed adjacent to the oscillating link 14 and provides lateral suport for the oscillating casting 14. Drive means to be subsequently described is carried on the stationary member 16 and causes oscillation of the oscillating member 14 relative to the stationary member 16.

The oscillating member 14 is mounted in such a manner on the hinged link 11 that it may have fore and aft and rotational movement in a generally longitudinally extending plane. The oscillating member 14 has movement imparted thereto by driving means mounted on the stationary supporting structure to one side of and spaced from the hinge attachment of the member 14 to the link 11. As will be later described, a cutting tool is carried on the oscillating member 14 on the end opposite the driving means thereof and spaced in the other direction from the hinge attachment of the member 14 to the link 11. Initial movement of the oscillating member 14 is in a generally fore and aft radial movement the distance which it is desired to cut radially in the piece being cut, thence the movement is substantially rotary or oscillating whereby the cutter is moved around in a substantial circle in a path commencing at the radial depth of cut, and finally the cutter is moved radially to its starting position.

Figure 2:
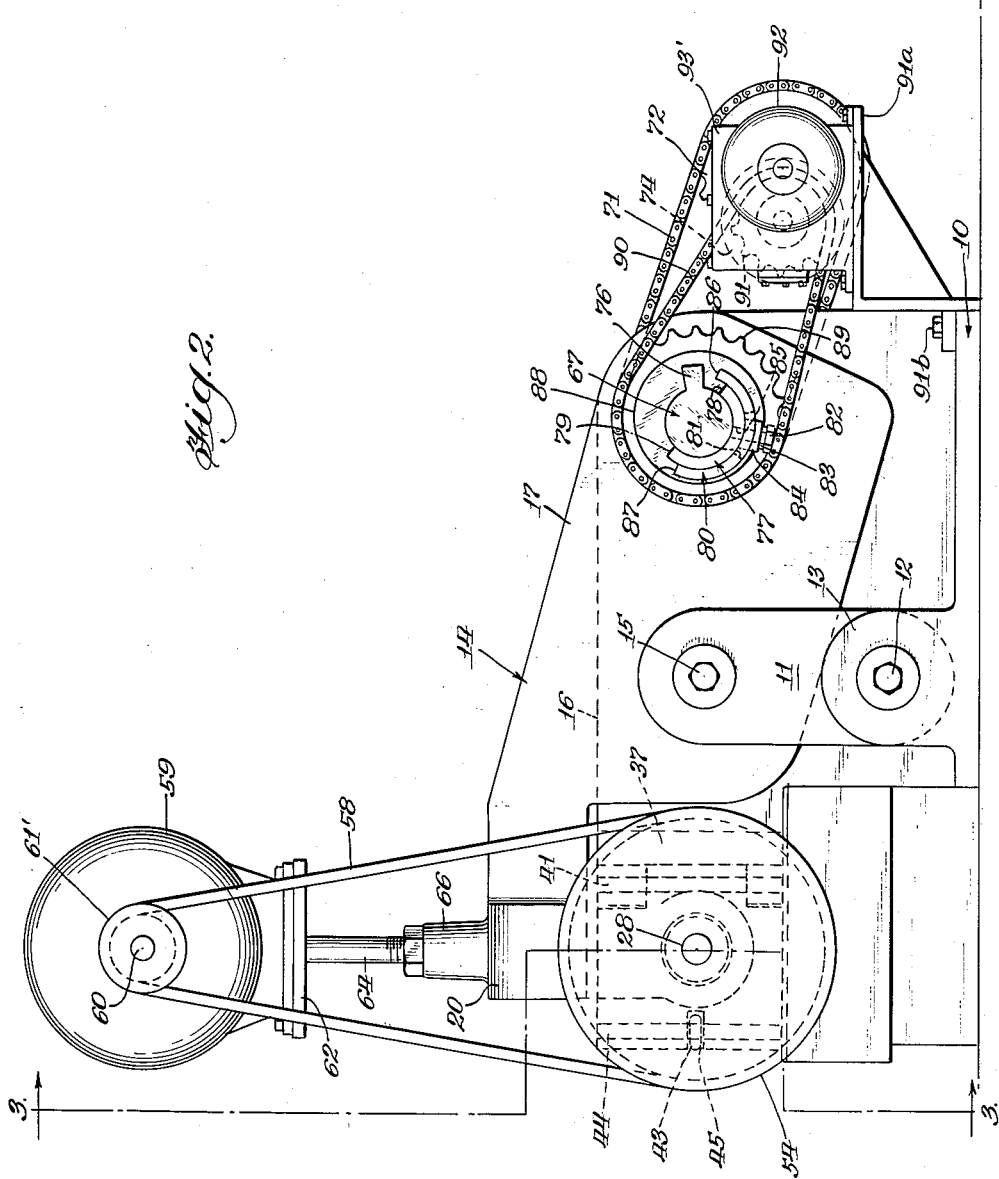
Figure 2 is a side elevational view of the device of Figure 1.
Figure 3:
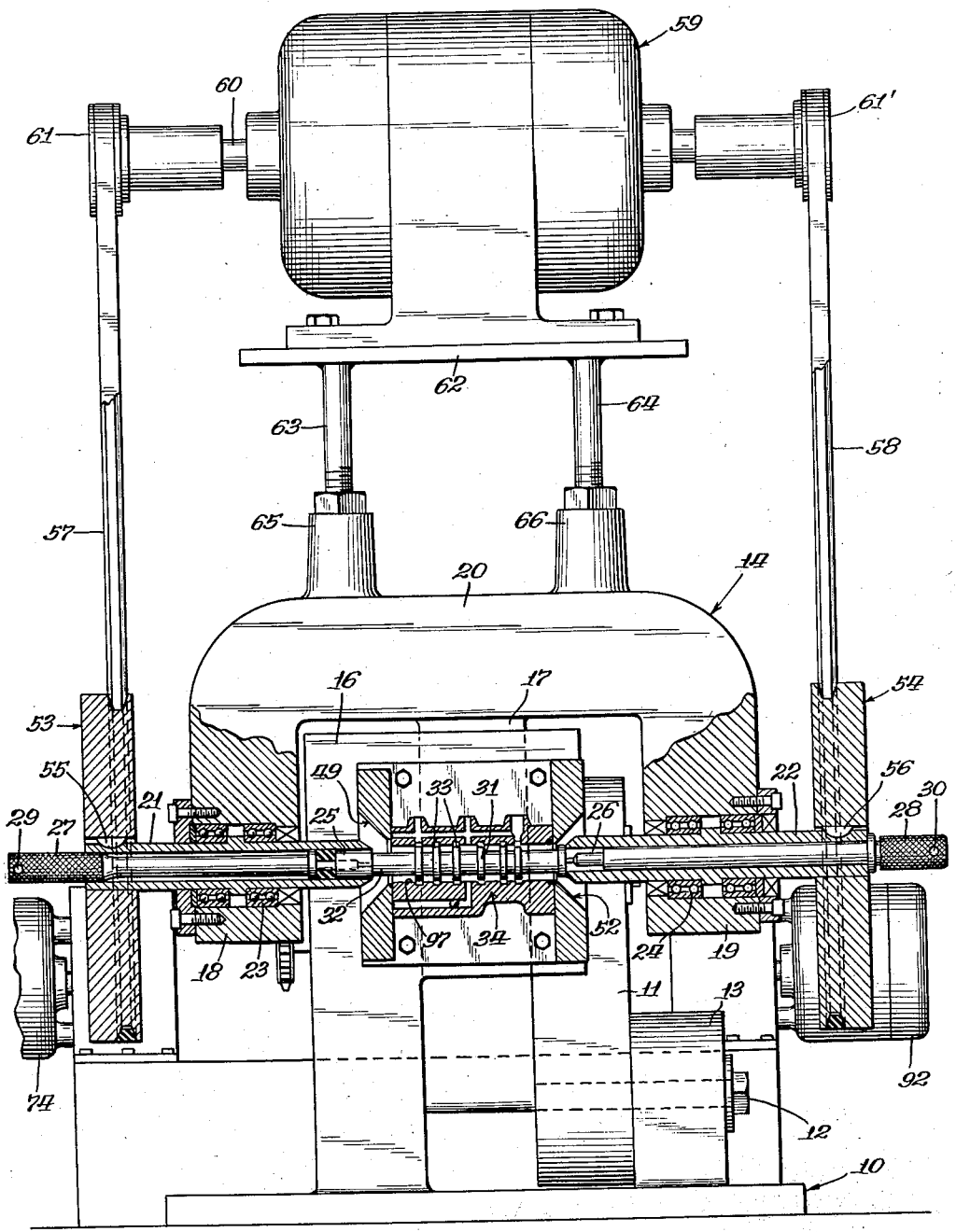
Figure 3 is an enlarged view partially in section of this machine taken on the line 3—3 of Figure 2.
Figure 4:
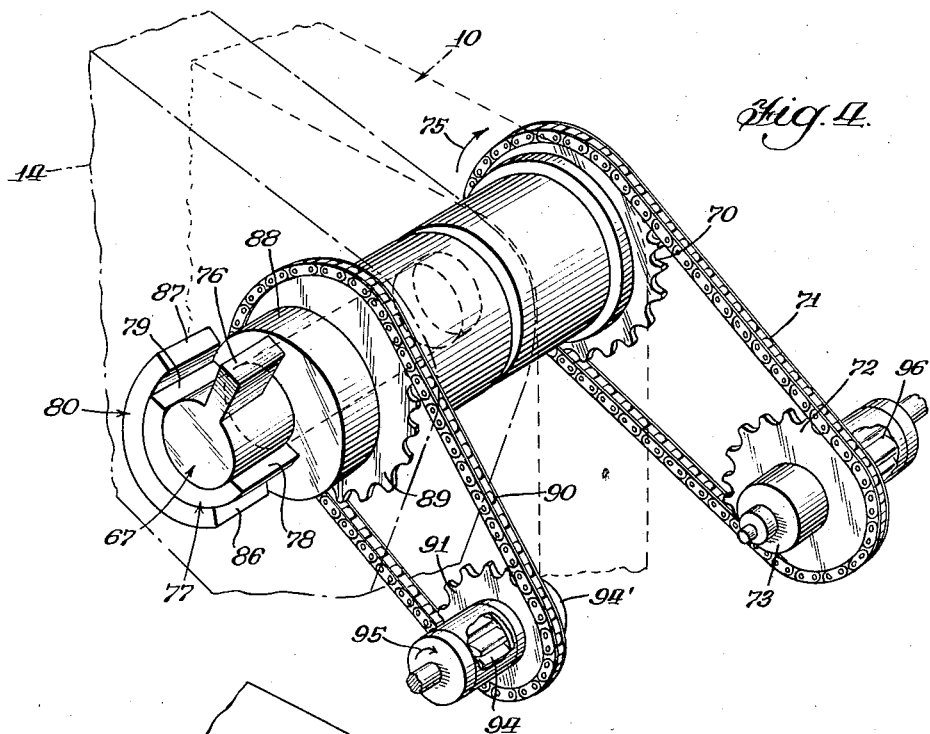
Figure 4 is an enlarged perspective view of the eccentric driving mechanism of this device.

The particular shape and structure of the oscillating casting 14 performs an important function to the successful operation of the groove grinding device of this invention. As best shown in Figures 1, 2 and 3 the casting 14 includes a longitudinally disposed portion 17 which lies adjacent to the stationary member 16 and also adjacent to the link 11. Further the portion 17 of the oscillating link or casting 14 is disposed between the members 11 and 16 as shown in Figures 1 and 2. The longitudinal portion 17 projects forwardly and divides in a fork-like front having downwardly depending spaced apart side members 18 and 19 joined by a cross top piece 20. Thus the rocking casting 14 includes the elongated plate-like portion 17 and the fork front 18, 19 and 20.

Aligned shafts 21 and 22 are journally mounted within the downwardly depending fork arms 18 and 19 respectively. The shafts 21 and 22 which are spaced apart at their inner ends are in the form of sleeves which are mounted within bearing members 23 and 24 respectively within the arms 18 and 19 as just described. The opposed and aligned sleeve shafts 21 and 22 form the tool holding device for this invention. Each of the sleeve shafts carries a retractable tool holding chuck 25 and 26 respectively having screw operating extensions 27 and 28. The chucks 25 and 26 are actuated by their outwardly extending operating members 27 and 28. These operating members are equipped with transverse openings 29 and 30 within which an operator may place a turning tool to effect an opening or a closing of the chucks 25 and 26 to thereupon hold a grinding or cutting tool 31 in position within the opposed shafts 21 and 22. The cutting tool 31 is a milling rotor and is removably positioned within the spaced apart chucks 25 and 26 within the sleeve shafts 21 and 22. As will be apparent from Figure 3 of the drawings the cutting tool 31 includes generally a shaft 32 and laterally spaced apart annular milling cutters or ribs 33. It should be understood that each of these raised annular ribs 33 are the milling tools which are employed to cut internal annular grooves in a valve body 34 to be mounted over the rotor milling tool 31.

Figure 5:
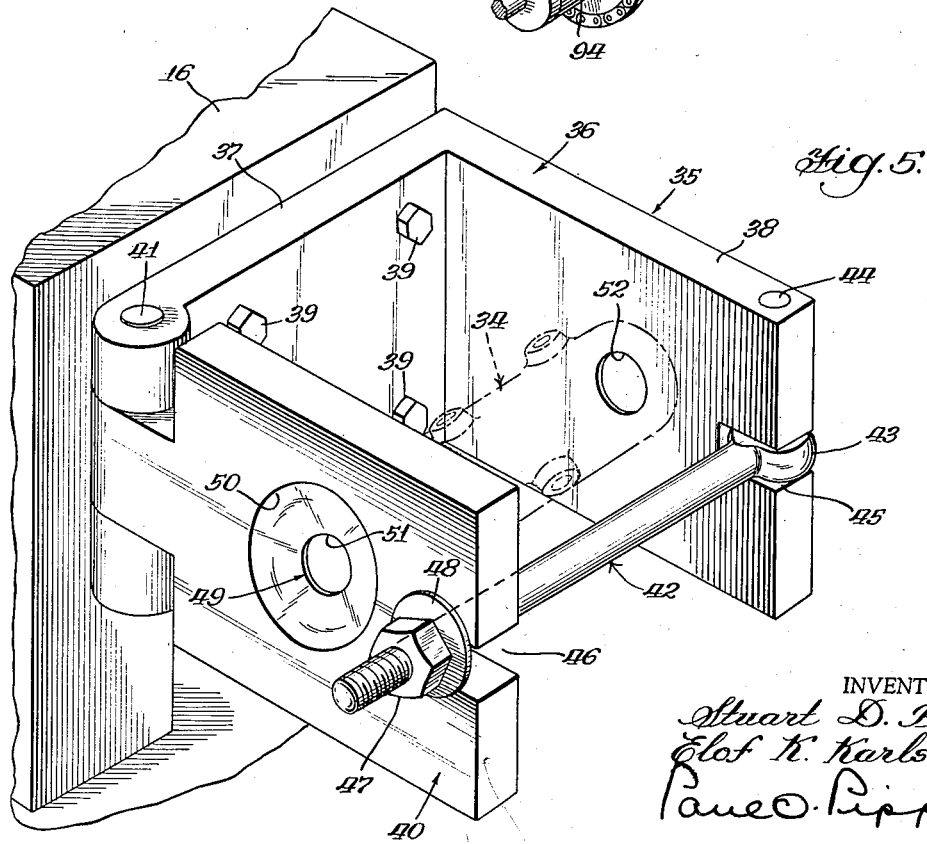
Figure 5 is a perspective view, also enlarged, of the body gripping mechanism of this invention.

The valve body 34 is held stationary while the milling tool 31 rotates about its axis and radially reciprocates, so as to have a varying orbital path as the tool 31 moves around the internal surface of the valve body 34 cutting the annular grooves. This holding of the valve body 34 is accomplished by means of an article or work holding fixture 35 as shown in Figure 5. The U-shaped fixture 35 includes a stationary L-shaped portion 36 having a back wall 37 and a forwardly projecting wall 38. The back wall 37 is shown fastened by means of bolts or the like 39 to the stationary member 16 of this machine. The holding fixture 35 also includes a forwardly projecting side 40 which is disposed parallel to the forwardly extending stationary side 38. The side 40 is hingedly mounted to the back wall 37 by means of a vertically disposed hinge 41. An eye bolt 42 having an eyelet head 43 is hinged by means of a vertical pin or the like 44 to the forward end of the stationary wall 38. A notch 45 is provided in the forward end of the wall 38 substantially midway between the top and bottom thereof to permit the eyelet 43 to be journalled therewithin. The forward end of the hinged wall 40 is equipped with a forwardly opening notch 46 which is adapted to permit swinging passage of the eye bolt 42. A nut 47 engages the eye bolt 42 and with the aid of a washer 48 the swinging side wall 40 is maintained in the position as shown in Figure 5. When the valve body 34 is placed over the cutting tool 31 and the cutting tool is inserted within the opposing chucks 25 and 26 the hinged side wall 40 of the holding fixture 35 is drawn up tightly by means of the nut 47 so that the valve body 34 is firmly gripped and held in a stationary position between the parallel side walls 38 and 40 of the holding fixture. Thus when the cutting tool 31 is rotated about its axis and moved radially by the motion of links 11 and 14; the result is a varying orbital path of the tool 31 that cuts annular grooves in stationary valve body 34.

As best shown in Figure 5 the hinged side wall 40 has an opening 49 extending therethrough to permit passage of the cutting tool 31 and to permit an outward swinging of the wall 40 of the holding fixture during placement of the valve body to be ground. The opening or hole 49 is equipped with an enlarged mouth 50 on the outer side of the wall 40 and a generally smaller opening 51 on the inner side of the wall 40. The hole 49 is thus defined more particularly as a tapering opening from a relatively large outside to a small inside. As shown in Figure 5 the rim of the reduced diameter opening 51 on the inside of the wall 40 is adapted to abut the annular end of the valve body 34 and thus act as a clamp for the valve body. Similarly an opening 52 is provided in the stationary wall 38 and acts to abut the other end of the valve body so that the valve body is clamped between the walls 38 and 40 of the holding fixture during grinding.

Rotational drive is delivered to the sleeve shafts 21 and 22 through combination V-belt pulleys and flywheels 53 and 54 which are keyed as shown at 55 and 56 to the sleeve shafts 21 and 22 respectively. V-belts 57 and 58 are employed to deliver rotational drive from a motor 59 to the pulleys 53 and 54 and thus also to the cutting tool 31. The motor 59 is equipped with a driving shaft 60 which has mounted on both ends thereof V-pulleys 61 and 61' which are in planar alignment with the lower pulleys 53 and 54 respectively so the V-belts 57 and 58 may be mounted therebetween to effect a driving from the motor 59 through the V-pulleys 61 and 61' to the pulleys 53 and 54 to effect a driving of the cutting tool 31 from both ends thereof. The motor 59 is preferably an electric motor and to operate is supplied a source of e.m.f. through the conduit 59'. The motor is mounted on a base member 62 which is supported on spaced-apart post members 63 and 64 which are in turn carried on boss member projections 65 and 66 on the cross member 20 of the oscillating casting or member 14. Thus it is apparent as the member 14 oscillates so also does the motor 59 and its driving elements for the cutting tool 31. It should be apparent also that the motor 59 imparts rotational drive to the cutting tool 31 and that reciprocating radial movement of the cutting tool 31 is accomplished by the oscillating casting 14 and link 11.

A shaft 67 is located generally at the rear of the device and is positioned transversely of the stationary portion 16 of the machine and also of the longitudinally extending portion 17 of the oscillating casting 14. A narrow portion 68 of the shaft although appearing eccentric is in fact concentric with the axis of rotation of the shaft and is located near one end thereof. This concentric portion 68 is journalled within the stationary frame member 16. The remainder of the shaft 67 beyond the portion 68 is designated by the numeral 69 and is in effect eccentric to the portion 68. The portion 69 of the shaft rotates around the same center as the center of the portion 68 so that it revolves with an eccentric motion. The shaft 67 is rotatably driven through the medium of a sprocket 70 which is keyed or otherwise fastened to the outer end thereof adjacent the relatively narrow portion 68 thereof. A chain 71 in engagement with the sprocket 70 is adapted to adjoin an aligned sprocket 72 which is mounted on a shaft 73 and in turn is driven by a motor 74 either directly or through the medium of a gear reduction mechanism 74'. The motor 74 is preferably an electric motor. The direction of rotation of the sprockets 70 and 72 is shown by an arrow at 75.

The shaft 67 includes a radially extending key 76 at the end thereof opposite the sprocket 70. An element which we shall term a stop base member is designated by the numeral 77. This member is somewhat greater than a semi-circle and is adapted to surround and snugly engage the shaft 67. The extremities of the member 77 constitute shoulders or lands 78 and 79 for abutment by the shaft key 76. The location of the spaced apart lands 78 and 79 on the stop base member 77 controls the eccentricity of the drive mechanism and thereby the degree of oscillation of the casting 14 and thus the depth of cut of the annular milling members 33 of the cutting tool 31 within annular grooves in the valve body 34. An outer covering member 80 is also substantially semi-circular in shape and is arranged for positioning around the stop base member 77. The member 80 is provided with an elongated slot 81 therein to facilitate fastening to the member 77 by means of a screw 82, a washer 83 and a spacer 84. The screw or bolt member 82 is adapted to pass through the spacer and washer through the elongated slot 81 in the member 80 and thereupon threadedly engages an aperture 85 in the member 77. Thus the member 80 may be adjusted relatively to the member 77 dependent upon the position thereof within the elongated slot 81. It is this adjustment that provides for the change in positioning of the effective lands 78 and 79. It should be obvious that shoulders or lands 86 and 87 of the member 80 can replace one or the other of the lands 78 and 79 and thereupon change or adjust the maximum eccentricity of the drive mechanism to gain a greater or lesser degree of milling controlled by the oscillating member 14.

An eccentric rotor 88 is journaled in the longitudinally extending portion 17 of the oscillating casting member 14 at substantially the rearmost end. A sprocket 89 is fastened to the eccentric member 88 and also to the stop base member 77 so that all three elements rotate as a unit. Thus, as the key 76 on the shaft 67 abuts the land or shoulder 78 of the stop base member 77 or the substitute land or shoulder 86 of the overlying member 80, if that land is higher than the land 78, rotation of the three unitary elements—the stop base member, the eccentric member and the sprocket—are caused to be rotated. A chain 90 engages the sprocket 89 and joins a sprocket 91 which is in planar alignment therewith and spaced rearwardly therefrom. Further, the sprocket 91 is approximately the same distance rearwardly as the sprocket 72. A supporting bracket 91a is fastened at 91b to the stationary frame supporting structure 10 and extends rearwardly therefrom. On one side of the bracket 91a there is carried the motor 74 and on the other side there is carried a second motor 92. This motor is also preferably electric. A motor shaft 93 is driven by the motor 92 and imparts rotation to a gear reducer 93' through an overrunning clutch 94 to the sprocket 91. The shaft device comparable to that shown at 73 is designated as 94'. The motor 92 is shown delivering its drive through the medium of a gear reduction device 93' so that more or less power may be delivered to the driving mechanism as necessary to accomplish the grinding operation. However, it should be understood the motor drive may be used directly. When the motor 92 is operating the overrunning clutch 94 rotates in the direction of the arrow 95. This, of course, is the same direction of rotation imparted to the mechanism by the motor 74. An overrunning clutch 96 is also provided between the shaft device 73 and the sprocket 72. This clutch 96 is so arranged that as the motor 74 drives it will operate to effect rotation in the manner indicated by the arrow 75 and thus impart similar rotation to the oscillating driving shaft 67.

The eccentricities between the shaft eccentric 69 and the eccentric rotor member 88 are such that when the shaft key 76 drives the unit 77, 88 and 89 the result is concentricity about the shaft 67. Because of the presence of the overrunning clutch 94 the motor 74 may effect drive of the unit as just described. The eccentric rotor member 88, as previously stated, fits into and is journaled within the oscillating casting 14 which rocks over the link 11. With only the motor 74 operating, the member 88 has no eccentric motion relative to the stationary supporting structure member 16. The oscillating casting 14 thus has no movement and no radial movement is being imparted to the cutter 31. The cutter 31 and its integral annular cutting surfaces 33 are disposed centrally within the valve body 34. When it is desirable to feed the cutter radially outwardly toward the periphery of the valve body bore 97 the sprocket 91 is commenced to be rotated by means of the separate motor 92 and the overrunning clutch 94. The sprocket 89 is driven slightly faster than the sprocket 70. The key 76 of the shaft 67 now no longer drives the assembly of the elements 77, 88 and 89. The fact that the eccentric rotor member 88 is moved to an eccentric position relative to the portion 69 of the shaft 67 causes an imparting of an eccentric motion to the casting 14 which carries the cutter 31, the combination flywheels and pulleys 53 and 54, and the motor 59. The eccentricity is now built up or increases while shaft 67 is rotating until the key 76, backing up, hits the opposite land 79 on the stop base member 77. Or, it should be understood, if the particular adjustment of the outer member 80 is such that the land 87 is higher than the land 79, then this condition occurs when the key 76 strikes the land 87. Eccentricity is now at the maximum, and simultaneously the cutters 33 are at their maximum depth of cut. Now there remains only the cutting of the full annular internal grooves at this depth. The overrunning clutch 96 operates to permit the sprocket 91 to drive the entire assembly of shaft and eccentric at a slightly faster speed. When the full annular cut in the valve body 34 is completed, the motor 92 driving the overrunning clutch 94 is stopped. At this time the key 76 quickly returns to the opposite land, either 78 or 86 on 77 or 80, at which point the cutter 31 will have returned to the center of the valve bore 97. The cutting of the internal grooves is now completed and the valve body may be removed by swinging open the eye bolt 42 after loosening the nut 47 and thereupon loosening and retracting the tool chucks 25 and 26, at which point the valve body 34 and the cutting tool may be swung outwardly and removed from one another and a new or uncut valve body placed over the cutting tool and re-inserted into the machine for grinding.

We are aware that numerous details of construction may be varied throughout a wide range without departing from the principles disclosed herein and we therefore do not propose limiting the patent granted hereon otherwise than as necessitated by the appended claims.

What is claimed is:

1. A cutting device comprising a stationary supporting structure, an oscillating member, a link pivotally joined to said stationary supporting structure at one end and pivotally joined to said oscillating member at its other end at a position between the ends of said oscillating member, a cutting tool journally mounted at one end of said oscillating member, driving means mounted on said oscillating member and arranged to rotatably drive said cutting tool about its axis, driven means interposed between said stationary supporting structure and the other end of said oscillating member to effect a pivotal movement of said link and oscillating member about the pivotal joining of the link to the stationary supporting structure and a curvilinear oscillation of the oscillating member about the pivotal joining of the link to the oscillating member in a manner to cause said cutting tool to move into an orbital path and thence around the orbital path and thence out of the orbital path while the cutting tool is rotating about its own axis.

2. A device as set forth in claim 1 in which said oscillating member includes an elongated portion and a forked end portion of spaced apart arms extending generally forwardly and thence downwardly, said elongated portion constituting the means for pivotally mounting said oscillating member on said link and said forked end portion with its spaced apart arms constituting the means for journally mounting the milling cutter.

3. A device as set forth in claim 2 in which said article holding fixture is located between said spaced apart arms of the forked end of the oscillating member, said article holding fixture being U-shaped and consisting of an L-shaped member having a back wall and a forwardly projecting wall and a side wall hinged to the L-shaped back wall of the member to facilitate insertion or removal of the article to be milled, and means for clamping the article to be milled within the U-shaped fixture.

4. A device as set forth in claim 3 in which a retractable tool holding chuck is provided in each of said spaced apart arms whereby the milling cutter may be preliminarily inserted through an article to be milled and placed into the article holding fixture, and said U-shaped fixture having aligned side openings to permit passage of the milling cutter for attachment to said tool holding chucks, whereby the article to be milled is held stationary while the milling cutter may be rotated and moved in a varying orbital path therewithin.

5. A device as set forth in claim 1 in which the driven means includes a shaft having a first portion thereof journaled for rotation in said stationary supporting structure, said shaft having a second portion eccentric to said first portion, an eccentric rotor journaled over said second portion, said eccentric rotor journaled within said oscillating member, means on said shaft and said eccentric rotor for driving therebetween in such a manner that the eccentric second portion of the shaft is balanced with the eccentric rotor whereby the effect is concentricity with the first portion of the shaft, and means rotatably driving said shaft.

6. A device as set forth in claim 5 in which the driven means further includes separate means rotatably driving said eccentric rotor to overrun the driving of said shaft including said second portion whereby the eccentric rotor is rotated relative to the eccentric second portion of the shaft to effect a driving of the oscillating member.

7. A device as set forth in claim 6 in which the means on the shaft and eccentric rotor includes a key on said shaft and a stop base on the eccentric rotor.

8. A device as set forth in claim 7 in which the means driving the shaft includes a first motor, a first motor shaft, a first overrunning clutch on said first motor shaft, a first sprocket mounted over said first overrunning clutch, a second sprocket on said first motor shaft in alignment with said first sprocket and a chain joining said first and second sprockets, and the separate means for driving said eccentric rotor includes a second motor having a second motor shaft, a second overrunning clutch mounted on said second motor shaft, a third sprocket mounted over said second overrunning clutch, a fourth sprocket fixedly associated with said eccentric rotor and in alignment with said third sprocket, and a chain joining said third and fourth sprockets.

References Cited in the file of this patent

UNITED STATES PATENTS

| | | |
|---|---|---|
| 807,194 | Nichols | Dec. 12, 1905 |
| 2,385,430 | Von Zelewsky et al. | Sept. 25, 1945 |
| 2,756,652 | McGee | July 31, 1956 |